(12) United States Patent
Reiss et al.

(10) Patent No.: US 7,181,694 B2
(45) Date of Patent: Feb. 20, 2007

(54) SOFTWARE CUSTOMIZATION OBJECTS FOR PROGRAMMING EXTENSIONS ASSOCIATED WITH A COMPUTER SYSTEM

(75) Inventors: Thomas Reiss, Heidelberg (DE); Felix Wente, Heidelberg (DE); Ralf Irrgang, St. Leon-Rot (DE)

(73) Assignee: SAP Aktiengesellschaft, Walldorf (DE)

( * ) Notice: Subject to any disclaimer, the term of this patent is extended or adjusted under 35 U.S.C. 154(b) by 654 days.

(21) Appl. No.: 10/158,212

(22) Filed: May 31, 2002

(65) Prior Publication Data
US 2003/0225937 A1  Dec. 4, 2003

(51) Int. Cl.
 G06F 3/00   (2006.01)
 G06F 9/00   (2006.01)
 G06F 17/00  (2006.01)
(52) U.S. Cl. .................. 715/747; 717/168; 717/169
(58) Field of Classification Search ............. 719/310, 719/332; 707/104.1; 717/100, 101, 107, 717/108, 168–170; 713/2; 715/744–747
See application file for complete search history.

(56) References Cited

U.S. PATENT DOCUMENTS

| | | | |
|---|---|---|---|
| 5,187,788 A | 2/1993 | Marmelstein | |
| 5,295,222 A | 3/1994 | Wadhwa et al. | |
| 5,321,803 A | 6/1994 | Ditter, Jr. | |
| 5,499,357 A | 3/1996 | Sonty | |
| 5,553,218 A | 9/1996 | Li et al. | |
| 5,687,366 A | 11/1997 | Harvey, III | |
| 5,717,924 A | 2/1998 | Kawai | |
| 5,721,912 A | 2/1998 | Stepczyk et al. | |
| 5,778,373 A | 7/1998 | Levy et al. | |
| 5,838,918 A | 11/1998 | Prager | |
| 5,913,218 A | 6/1999 | Carney | |
| 5,950,190 A | 9/1999 | Yeager et al. | |
| 5,978,579 A * | 11/1999 | Buxton et al. | 717/107 |
| 6,038,586 A | 3/2000 | Frye | |
| 6,047,279 A | 4/2000 | Barrack | |
| 6,098,098 A | 8/2000 | Sandahl | |
| 6,128,730 A | 10/2000 | Levine | |
| 6,182,279 B1 * | 1/2001 | Buxton | 717/100 |
| 6,195,794 B1 * | 2/2001 | Buxton | 717/108 |
| 6,202,207 B1 | 3/2001 | Donohue | |
| 6,219,696 B1 | 4/2001 | Wynblatt | |
| 6,219,719 B1 | 4/2001 | Graf | |
| 6,243,747 B1 | 6/2001 | Lewis | |

(Continued)

FOREIGN PATENT DOCUMENTS

GB  2334601 A  8/1999

OTHER PUBLICATIONS

Islam "Customizing system software using OO frameworks", 1997 IEEE, pp. 69-78.□□.*

(Continued)

Primary Examiner—Van H. Nguyen
(74) Attorney, Agent, or Firm—Fish & Richardson P.C.

(57) ABSTRACT

A system may be customized by adding one or more software objects without detailed knowledge of the data model or the programming techniques used in the system. A user interface may be developed to guide the user to define a particular type of extension for one or more systems. The user-entered extension definition and a series of generic templates may be used to generate the particular objects to be added to each system.

27 Claims, 7 Drawing Sheets

U.S. PATENT DOCUMENTS

| | | |
|---|---|---|
| 6,330,586 B1 | 12/2001 | Yates |
| 6,339,755 B1 | 1/2002 | Hetherington |
| 6,366,917 B1 | 4/2002 | Herbert |
| 6,463,430 B1 | 10/2002 | Brady |
| 6,473,794 B1 | 10/2002 | Guheen |
| 6,507,813 B2 | 1/2003 | Veditz |
| 6,532,491 B1 | 3/2003 | Lakis |
| 6,560,704 B2 | 5/2003 | Dieterman |
| 6,718,464 B2 * | 4/2004 | Cromer et al. ................ 713/2 |
| 6,792,462 B2 | 9/2004 | Bernhardt |
| 6,868,427 B2 * | 3/2005 | Herzog et al. ........... 707/104.1 |
| 6,990,601 B1 | 1/2006 | Tsuneya |

OTHER PUBLICATIONS

Ramanathan "Providing customized assistant for software lifecycle approaches", 1988 IEEE, pp. 749-757.□□.*

Georgakopoulos et al. Customizing transaction models and mechanism in a.*

SAP Service Marketplace publication entitled "Customizing Scout," Published Mar. 19, 2001.

* cited by examiner

SOFTWARE CUSTOMIZATION OBJECTS FOR PROGRAMMING EXTENSIONS ASSOCIATED WITH A COMPUTER SYSTEM

CROSS REFERENCE TO RELATED APPLICATIONS

This application is related to U.S. application Ser. No. 10/157,953, titled MANAGING CUSTOMIZABLE SETTINGS IN COMPUTER SYSTEMS, filed on May 31, 2002 and now issued as U.S. Pat. No. 6,868,427 and U.S. application Ser. No. 10/157,878, titled DISTRIBUTING CUSTOMIZED COMPUTER SETTINGS TO AFFECTED SYSTEMS and filed on May 31, 2002.

TECHNICAL FIELD

This description relates to techniques for the customization of systems.

BACKGROUND

An application program or system running on a computer may be customized to meet the specific requirements of a group of users, such as a particular company or a particular department in a company. Examples of application programs or systems include, for example, an enterprise resource management system, a financial management system, a human resources management system, a supply chain management system, and a marketing system. Examples of system customization include customization of the data model, the process model, or the user interface of the system. Customization of a system may require knowledge of the data model of the system and programming techniques used to develop the system.

A particular group of users, such as a company, may require the same or similar customizations to be applied to more than one system. For example, a particular customization may need to be applied to more than one instance of the same system (e.g., a development instance, a testing instance, and a production instance of a particular system) or may need to be applied to more than one system (e.g., a financial management system and a human resources management system). The systems to which an extension may need to be applied may use different programming techniques or models (e.g., a financial management system may use object-oriented technology to represent financial information, while a human resource management system uses a distributed relational database system to represent human resources information).

SUMMARY

A system may be customized by adding one or more software objects (which may be referred to as extending a system) without detailed knowledge of the data model or the programming techniques used in the system. A user interface may be developed to guide the user to define a particular type of extension for one or more systems. The particular extension definition and a series of generic templates may be used to generate the particular software objects to be added to each system. Thus, a user without detailed knowledge of the data model or programming techniques used in each system may be able to customize one or more systems.

In one general aspect, when a computer system is customized, customization information for an extension for one or more computer systems, with each computer system being associated with one or more programming models, is received. Customization process information associated with the customization information for the extension and associated with one or more programming templates, with each programming template being associated with a programming model, is accessed. One or more customization objects are generated for the programming model associated with the accessed programming template using the accessed customization process information and the accessed programming template.

Implementations may include one or more of the following features. For example, customization information may include information about a table to be added to one or more of the computer systems, and customization objects generated may include a database table to be added or a user interface associated with a database table to be added. A generated customization object may be associated with a particular extension for a particular computer system.

An interface to customization project information for one or more computer systems may be provided. The customization project information may be accessed, inspected, and modified using the interface. Modification of the customization project information may include adding, updating, and deleting customization project information. Customization project information may include information for customizing at least two computer systems.

In another general aspect, when a computer system is customized, a user interface may be generated that associates one or more types of modifications to be made to one or more computer systems with a series of user interfaces to request customization information from a user. Each user interface may be displayed and customization information for the particular type of modification may be received from the user and stored.

Implementations may include one or more of the following features. For example, one or more types of modifications to be made may be displayed in the user interface and user may select one of the types of modifications. Each user interface may include a request for a particular type of customization information and a description of the requested particular type of customization information. Customization information may include an attributed name, an attribute data type, and an attribute length. Customization information may also include the name of a first data table to be associated with a second data table.

Implementations of the techniques discussed above may include a method or process, an apparatus or system, or computer software on a computer-accessible medium.

The details of one or more of the implementations are set forth in the accompanying drawings and description below. Other features will be apparent from the description and drawings, and from the claims.

DETAILED DESCRIPTION

Figure 1:
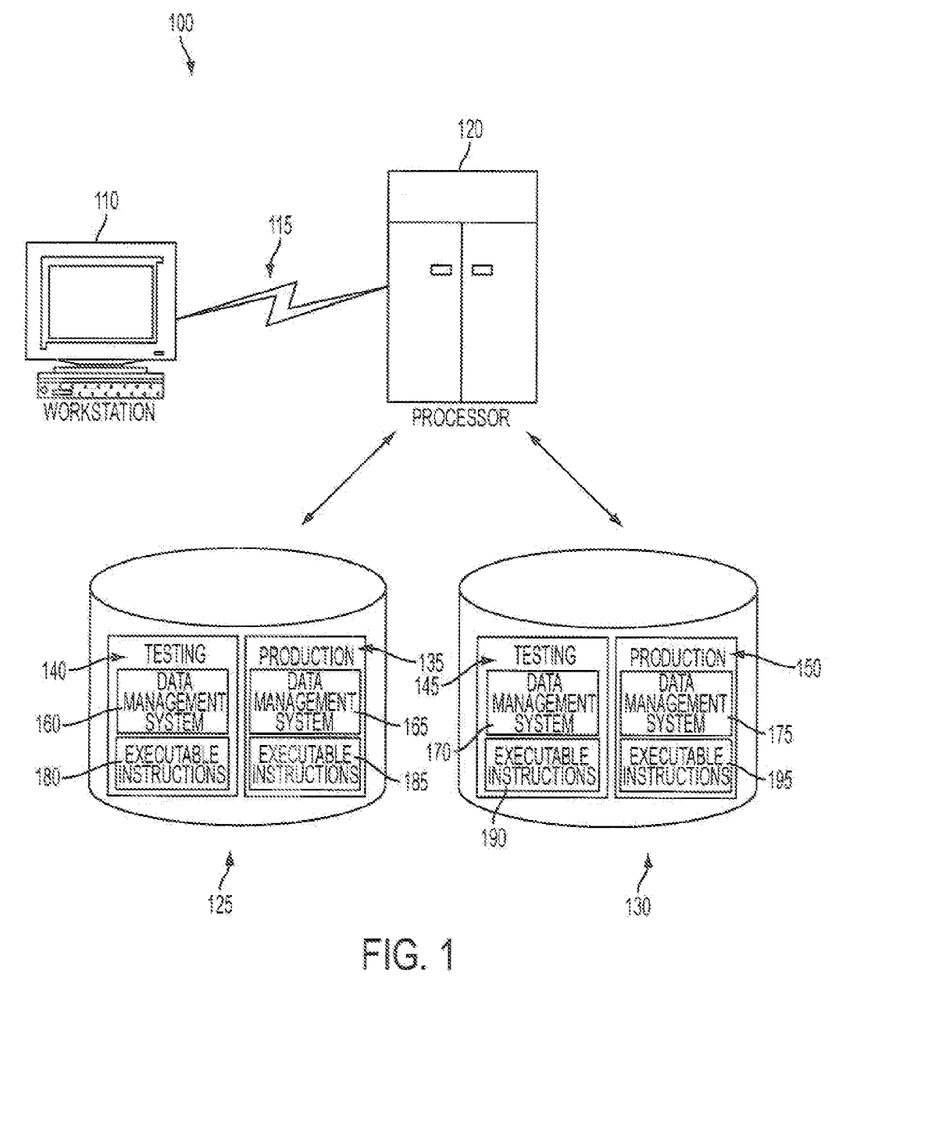
FIG. 1 is a block diagram of an extension workbench for adding software objects to a system.

FIG. 1 shows a block diagram of an extension workbench 110 that may be used to add a software object to one or more systems. The extension workbench 110 is connected through a communication pathway 115 to an enterprise server 120. The extension workbench 110 and the enterprise server 120 may be arranged to operate within or in concert with one or more other systems, such as, for example, one or more LANs ("Local Area Networks") and/or one or more WANs ("Wide Area Networks").

The extension workbench 110 may be a general-purpose computer that is programmed to operate as an extension workbench (e.g., a desktop personal computer, workstation, or a laptop computer running an extension workbench application program) or a more special-purpose computer (e.g., a device specifically programmed to operate as an extension workbench).

The enterprise server 120 operates enterprise systems 125 and 130. Enterprise system 125 includes a production instance 135 and a testing instance 140. The production instance 135 is an active (e.g., "live") environment used to support the enterprise. The testing instance 140 is isolated from the production system and is used to verify customizations before the customizations are applied to the production instance. Similarly, enterprise system 130 includes a production instance 145 and a testing instance 150. Each of the instances 135, 140, 145, and 150 includes a data management system component (160, 165, 170, or 175) and a set of executable instructions (180, 185, 190, or 195) applicable for the enterprise system 125 or 130 to which the instance relates.

A data management system component 160, 165, 170, or 175 may include information about the data structure, data models, and the data for the associated instance. The executable instructions 180, 185, 190, or 195 may include the executable instructions for the user interface and processing required by the instance of the enterprise system to which the executable instructions relate.

An extension workbench 110 may be used to define a system extension for one or more systems, such as enterprise system 125 and 130, and to create the appropriate software objects to extend each system, even when enterprise systems 125 and 130 use different data models or programming techniques. For example, software objects created to add a new attribute to an employee record in enterprise systems 125 and 130 may use object-oriented techniques appropriate for enterprise system 125 and relational data management techniques and programming techniques (e.g., a particular programming language) appropriate for enterprise system 130. The software objects created for enterprise system 125 may be applied to testing instance 140 to verify the results of adding the software objects to the instance before moving the software objects to production instance 135. Similarly, the software objects created for enterprise system 130 may be applied to testing instance 150 and/or production instance 145.

Figure 2:
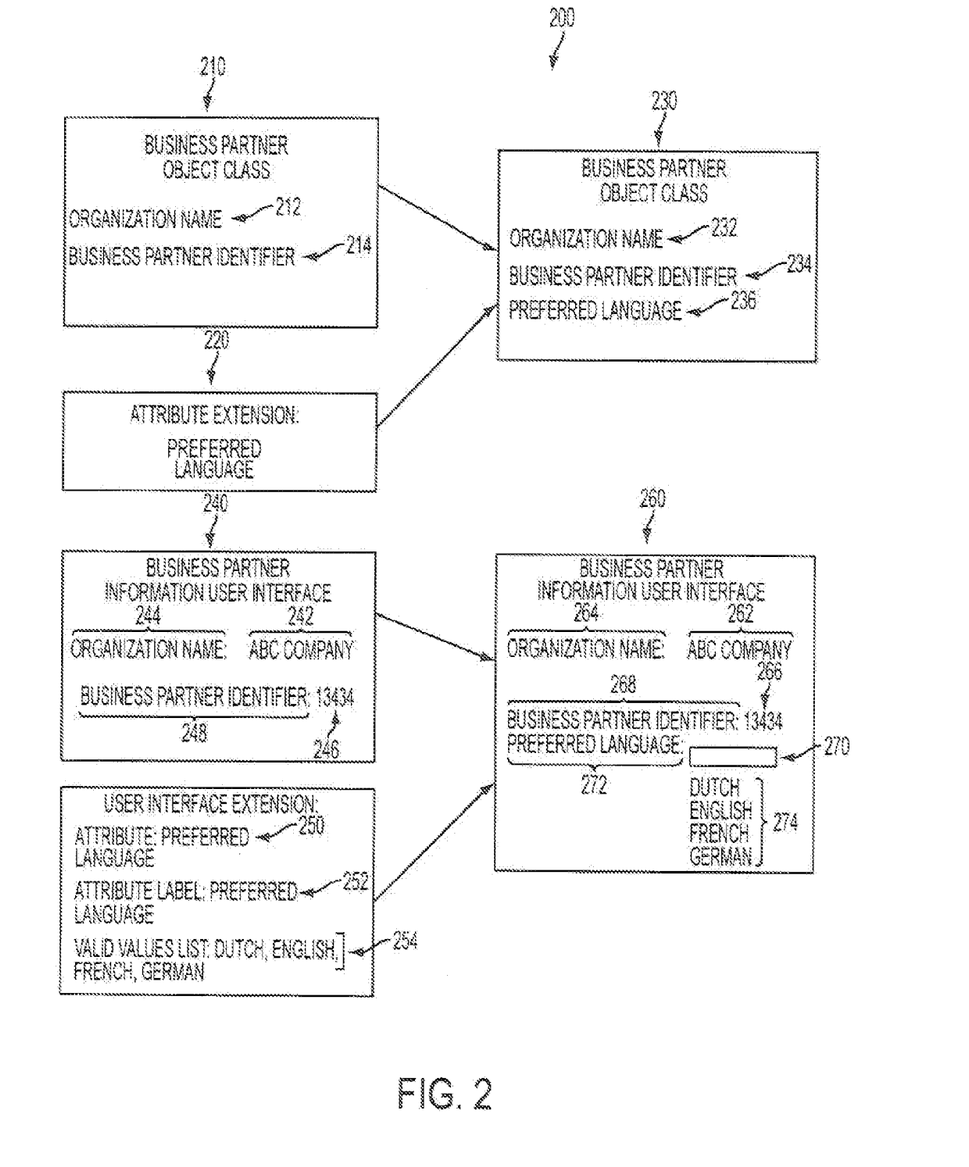
FIGS. 2 and 3 are block diagrams illustrating the results of adding a software object to a system.
Figure 3:
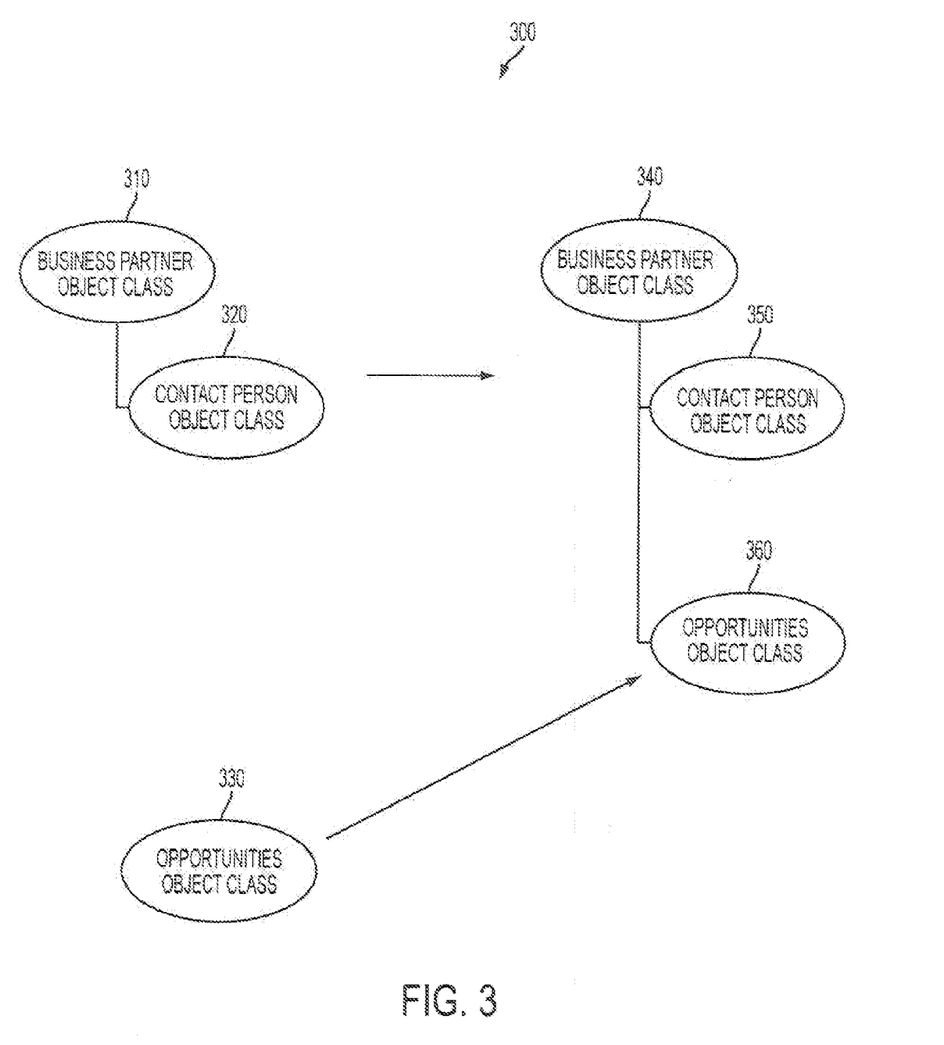

FIGS. 2 and 3 show the results of a process to add software objects to a system. Typically, extending a system involves adding data to a system. Data in a system may be stored in an object-oriented database that logically or physically organizes data into a series of objects, a relational database, or another type of data management system. Each object may be associated with a series of attributes, and each instance of an object may be associated with a series of attribute values.

Data also may be stored in a relational database that logically organizes data into a series of database tables. A database table may arrange data associated with an entity in a series of columns and rows. Each column may describe an attribute of the entity for which data is being stored. Each row may represent a collection of attribute values for a particular entity.

Some systems may use a relational database to store object data. Data also may be stored physically in one or more relational database tables and organized logically as a series of objects. Typically, a relational database table may be used to store data belonging to a particular object class, and each row in the relational database table may represent an object instance.

Data also may be stored in a type of data management system that may not use a relational or object database. For example, a series of XML (Extensible Mark-up Language) documents may be used. XML is a language similar to hypertext markup language (HTML), but with the additional flexibility of being able to describe data structures that can be processed directly as data by a program.

FIGS. 2 and 3, for illustrative purposes, describe data involved in system extension as being objects. The benefits of the techniques described are not limited to that particular implementation, and are equally applicable to implementations involving other types of data management systems, such as relational database systems and XML-based systems.

Typically, extending a system to add data involves adding one or more attributes to an object class or modifying one or more user interfaces to include the added attributes. Extending a system may involve adding an object class with associated attributes that refer to another object. An object that refers to another object may be called a referring object or a dependent object. For example, an employee object class may be associated with a series of attributes (such as first name, last name, and employee identification number) and may be related to two instances of a phone number referring object class (that each are associated with a particular phone number) and one instance of a work address referring object class (that is associated with address attribute values, such as street address, city, state, zip code, and country).

FIG. 2 shows the results of adding an attribute to a system. For brevity, only a small number of attributes are shown. Business partner object class 210 having attributes organization name 212 and business partner identifier 214 is extended to include attribute preferred language 220. The resulting data object for business partner object 230 includes the attributes of organization name 232, business partner identifier 234, and preferred language 236.

The user interface for business partner information is modified during the system extension process. Originally, the user interface for a particular business partner instance 240 displays a value associated with an organization name attribute 242 (and an associated label 244) and a value associated with a business partner identifier 246 (and an associated label 248) for the instance. The user interface is extended to allow a user to enter a preferred language 250 for a business partner instance, the attribute is described by the user interface as "preferred language" 252, and only one of the values of Dutch, English, French, and German is valid for a preferred language value entered by the user 254.

After extension, the user interface for a particular business partner instance 260 displays a value associated with an organization name attribute 262 (and an associated label 264), a value associated with a business partner identifier 266 (and an associated label 268), a value associated with a preferred language 270 (shown as blank) (and an associated label 272), and a list 274 of valid values from which a preferred language may be selected.

FIG. 3 illustrates the results of adding a referring object class to a business partner object class 310. Originally, the business partner object class 310 only is related to a contact person object class 320. The business partner object class 310 is extended to include opportunities object class 330. The extended business partner object class 340 is related to contact person object class 350 and opportunities object class 360. Object attributes and an associated user interface for displaying or entering attribute values for opportunities data class may be added.

Figure 4:
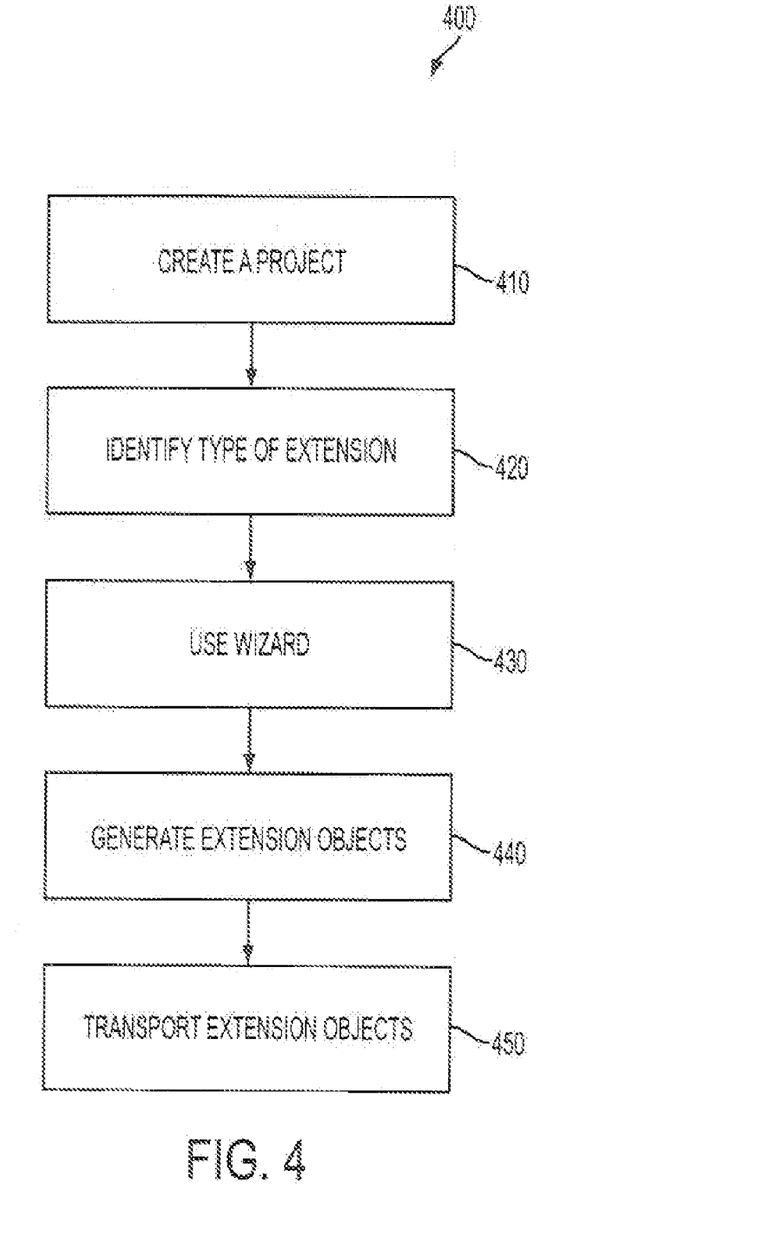
FIG. 4 is a flow chart of a process for adding a software object to a system.

FIG. 4 depicts a process 400 supported by an extension workbench for adding software objects to one or more systems without knowledge of the data model or the programming techniques used in the one or more systems. The extension workbench presents a user interface to guide the user to define a particular type of extension for one or more systems. The extension workbench uses a particular extension definition, processes information about the steps required to perform the particular type of extension, and a series of generic templates to generate the particular objects to be added to each system. The generated objects then are transported to one or more instances of each system.

The process 400 to extend a system begins by the extension workbench presenting a user interface for the user to create extension project information for a particular extension project (step 410). The extension project information may include a project name, a description, and a name for the transport package that is to include one or more extension objects associated with the project. The workbench may store the extension project information.

The extension workbench presents an interface that allows a user to identify the type of extension to be performed (step 420). For example, the extension workbench may present a list of extension types from which the user may select, such as, adding a data table that refers to a business partner table or adding an attribute to an employee table. Additionally or alternatively, the user may provide descriptive information for the extension, such as an extension name and an extension description.

Based on the extension type identified, the extension workbench activates an appropriate extension workbench wizard to guide the user through the process of defining a particular extension (step 430). For example, if the user is creating a new table that related to the business partner table, the user may be prompted to enter a table name, identify the key field for the table, define the one or more attributes to be included in the table, identify the one or more systems which will be customized by the extension, and, optionally, identify the data set to which the table is associated. The extension workbench wizard-guided process for defining a table extension is described with respect to FIG. 5.

The extension workbench presents an interface that allows a user to initiate the generation of the objects required to be added to the one or more systems based on the extension definition provided by the user in step 430. In response to the user's instruction, the extension workbench generates the objects required for each system (step 440). In general, the extension workbench uses a particular extension definition, process information about the steps required to perform the particular type of extension, and a series of generic templates to generate the particular objects to be added to each system. The process for generating software objects is described further with respect to FIG. 6.

The extension workbench presents an interface that allows a user to initiate the packaging of the generated extension objects for transport. Based on the user's instruction, the extension workbench associates each generated object with the name of the transport package identified in the project information (step 450). The generated objects then are moved to and installed in one or more instances of each system. For example, a system administrator may move the transport package from the extension workbench to the testing instance of each system for which the extension was generated.

Some implementations may organize the software objects generated based on the system for which each software object was generated. For example, all the software objects generated for a human resources system may be organized into a first transport package, and all of the software objects generated for a financial management system may be organized into a second transport package. Other implementations may produce a transport package that has all the software objects generated. The transport package is moved to all systems and the appropriate software objects that apply to a particular system are installed in each particular system.

Some implementations may provide for modifying or deleting extension information or project information.

Figure 5:
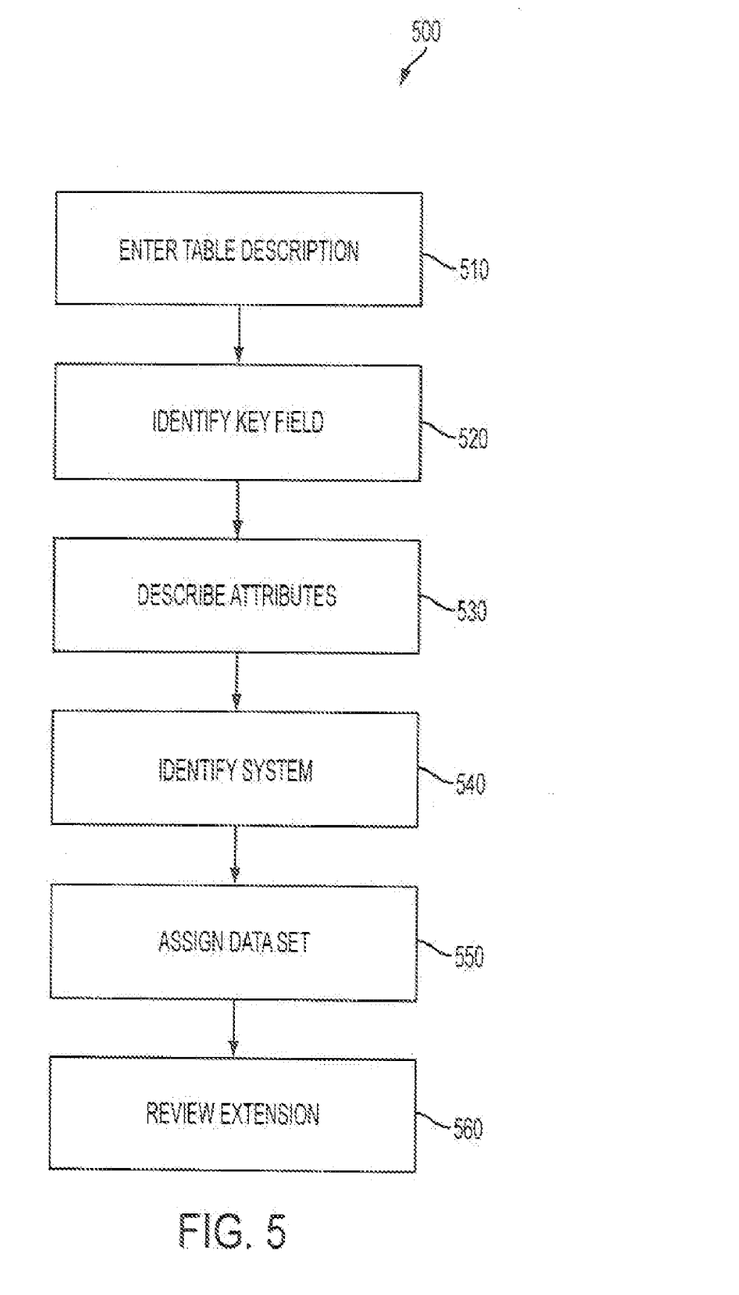
FIG. 5 is a flow chart of a process for defining a system extension.

FIG. 5 illustrates a process 500 for using an extension workbench extension workbench wizard to define a system extension for adding a new attribute to a business partner table. An extension workbench wizard is particular to a type of extension. Other types of extension workbench wizards may be used to guide users through defining other types of system extensions.

The extension workbench wizard prompts the user to enter a name for the data table that the extension workbench will create to store values for the new business partner attribute (step 510).

The extension workbench wizard then prompts the user to select one of a series of possible key fields for the new data table (step 520). A text phrase is presented for each possible key field. For example, the user may be asked to identify the key field for the new data table from the two choices of a business partner identification number and a business partner name.

The extension workbench wizard prompts the user to describe the attribute to be added (step 530). The user may enter a description for the attribute that may be used as a label for the attribute when displayed or printed, the type of data field (e.g., numerical or text) and the field length.

The extension workbench wizard prompts the user to identify the one or more systems to which the attribute is to be added (step 540). For example, the extension workbench wizard may present a list of the one or more systems to which the extension workbench is capable of adding the attribute, and the user may select one or more systems from the list for which the extension objects are to be developed. The systems, for example, may be a human resource management system using object-oriented techniques and a financial management system using relational data management techniques and a C++ programming language.

The extension workbench wizard prompts the user to assign a data set to which the new table is to be added (step 550). If the user does not specify a data set, the extension workbench wizard selects a data set. For example, the extension workbench wizard may present a list of the one or more data sets to which the extension workbench is capable of adding the table, and the user may select from the data sets displayed.

The extension workbench wizard displays a summary of the extension defined by the user for review by the user (step 560). Some implementations may allow the user to modify or delete an extension definition.

Figure 6:
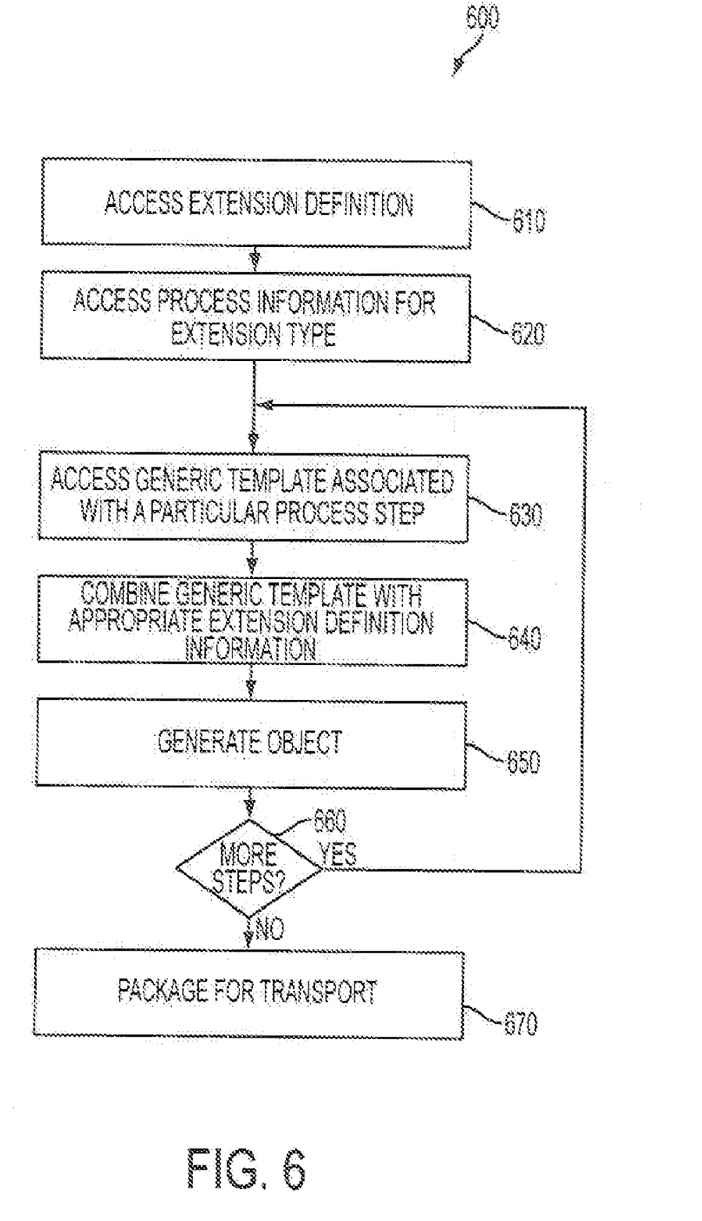
FIG. 6 is a flow chart of a process for generating software objects for a system extension.

FIG. 6 shows a process 600 for generating extension objects. The process 600 begins when the user instructs the extension workbench to generate extension objects, such as in step 540 of FIG. 5.

The extension workbench accesses the extension definition information. The extension definition information describes the type of extension and user-defined information about the extension, such as is described with respect to FIG. 5 (step 510).

The extension workbench also accesses process information for the type of extension identified in the extension definition (step 620). The process information includes each step required to be performed to accomplish the type of extension and associates a generic template that may be used to generate the object required by each step for each system. For example, to add a table that refers to the business partner table (e.g., type of extension), the process information in the following table may be accessed and used to generate the required software objects.

| Extension Type | Step | Generic Object Generation Template | System/Technology |
| --- | --- | --- | --- |
| Add-table-to-business-partner extension | Generate new table that relates to business partner | Business-partner-new-table-HR template | Human resources system using object-oriented techniques |
| Add-table-to-business-partner extension | Generate new table that relates to business partner | Business-partner-new-table-FM template | Financial management system using relation data management and C++ programming techniques |
| Add-table-to-business-partner extension | Generate index for new table | Business-partner-new-table-index-HR template | Human resources system using object-oriented techniques |
| Add-table-to-business-partner extension | Generate index for new table | Business-partner-new-table-index-FM template | Financial management system using relation data management and C++ programming techniques |
| Add-table-to-business-partner extension | Generate display window for new table | Business-partner-new-table-display-HR template | Human resources system using object-oriented techniques |
| Add-table-to-business-partner extension | Generate display window for new table | Business-partner-new-table-display-FM template | Financial management system using relation data management and C++ programming techniques |

The extension workbench processes each step identified for the particular type of extension (steps 630–650). To process a particular step, the extension workbench accesses the generic template associated with the step in the process information (step 630), combines the appropriate extension definition information with the generic template (step 640), and generates the object from the combined information (step 650). This may be accomplished, for example, by using an object generation application program interface (API) as a generic template and calling the object generation API that corresponds to the step being performed with appropriate parameters based on the information specified in the extension definition. A create-table API may be called with, for example, parameters defining a table name, a key, and each attribute to be created from the extension definition entered by the user.

If more steps are indicated by the process information for the extension type (step 660), the extension workbench processes the next step (steps 630–650). When all of the steps indicated by the processing information have been completed (step 660), the extension workbench packages the generated objects for transport to the system to which the object is to be added (step 670). For example, the software objects that apply to each system may be associated with a transport file that may be moved to the one or more systems to which the software objects apply.

Figure 7:
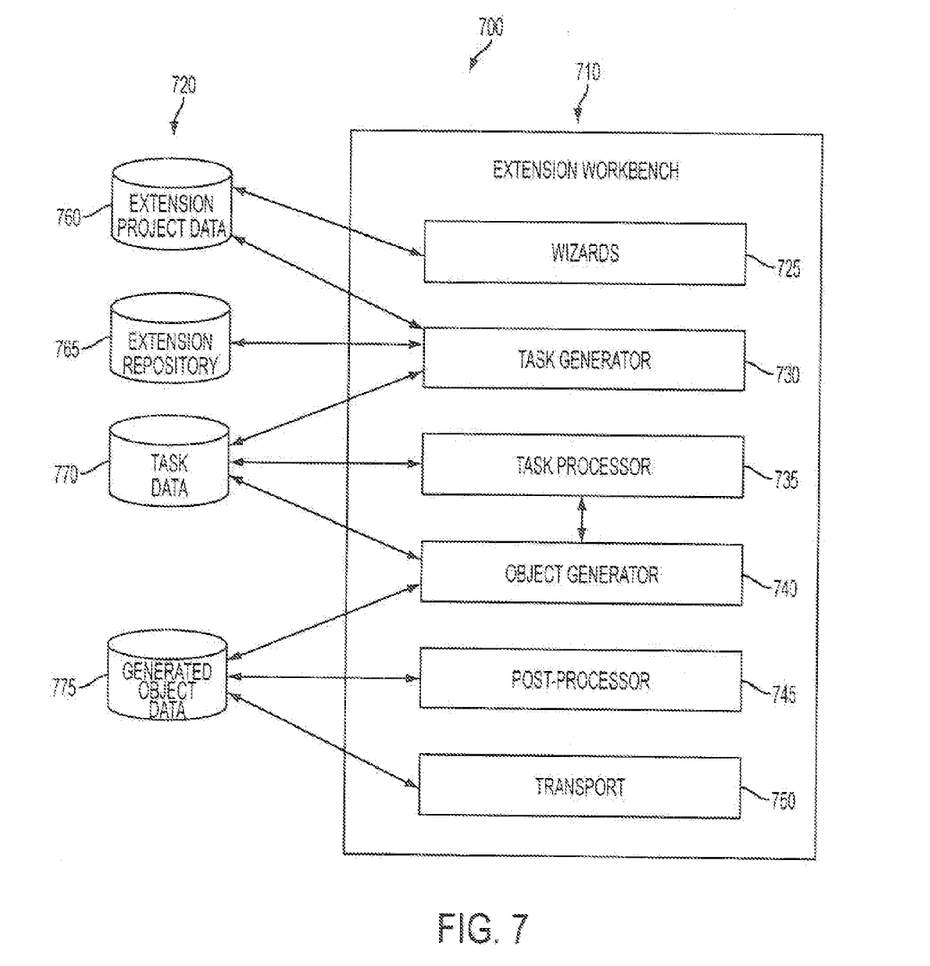
FIG. 7 is a diagram of the components of a software architecture for extending objects in a system.

FIG. 7 depicts the components of the software architecture 700 for adding software objects to a system. The software architecture 700 has an extension workbench processing component 710 and data components 720 used by the extension workbench. Extension workbench 710 includes wizards 725, a task generator 730, a task processor 735, an object generator 740, a post-processor 745, and a transport 750. Data components 720 include extension project data 760, an extension repository 765, task data 770, and generated object data 775.

Extension workbench 710 receives project information, such as a project name and a description, from the user. The project information describes a project to extend a system by adding one or more software objects. The project information may help the user organize more than one extension project and identify a particular extension project to process using the extension workbench. The extension workbench 710 stores the project information in extension project data 760.

An extension workbench wizard 725 is a user interface that guides a user to define a particular extension, such as adding one or more attributes to a business partner or adding a new role for a business partner. The wizard guides the user through the process to define a particular extension. For example, the extension workbench wizard may prompt the user for information and provide lists of alternatives from which the user may select, such as is described with respect to FIG. 5. A extension workbench wizard may provide textual explanation (typically, one to three sentences) for the information to be provided or other context-sensitive assistance to the user.

The task generator 730 uses a particular extension definition for a particular project in the extension project data 720 and the process information for the particular extension type stored in the extension repository 765 to develop a series of steps for accomplishing the particular extension as described by the user. The series of steps may be referred to as a task and may be stored in task data 770. For example, a task may include a list of changes for modifying the user interface and for modifying the database, as described with respect to FIG. 6. Some implementations, for example, may create separate tasks for modifying the user interface and for modifying the database.

The task processor 735 accesses the task data 770 stored for a particular project extension and manages the generation of objects to extend the system. The generation of each object required is performed by the object generator 740 based on instructions provided by the task processor 735 using a generic template for the object being generated. Typically, the task processor 735 may repeatedly call an object generator API with appropriate parameters based on information specified in the extension definition, as described with respect to FIG. 6. The generated objects are stored in generated object data 775.

The post-processor 745 optionally allows the user to modify the resulting generated objects. For example, the user may modify the user interface object generated by moving the added attribute to a different position on the display screen or window. The user also may add executable instructions (e.g., programming code) to a generated object to provide functionality that is not generated directly by the extendable workbench 710. For example, a user may add custom programming code at a predefined place in an application program (e.g., upon exiting an attribute input field, entering a particular window, or exiting a particular window). A predefined place for adding custom programming code may be referred to as a user exit or customer exit. The modified objects are stored in generated object data 775.

The transport 750 generates one or more transport packages to move one or more generated objects to the system or systems for which the extensions were generated. For example, the objects generated for a particular task may be transported to a development instance and a testing instance of a particular system. The transport packages are stored in generated object data 775.

Some implementations may support an expert programming mode in which users with knowledge about programming techniques may add customizations not supported by the extension workbench 710.

The extension workbench may be extended to support additional extensions by adding an extension workbench wizard to prompt the user for an extension, appropriate process information for generating software objects for an extension, and appropriate generic templates. Additional systems may be supported for an existing extension type by adding appropriate generic templates for each software object to be created in the additional system and modifying the process information for the extension type to be associated with the generic template.

Implementations may include a method or process, an apparatus or system, or computer software on a computer medium. It will be understood that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components. Some implementations may provide version control by associating a version number with each object generated and allow the removal of all objects associated with a particular version number to remove an extension that has been applied to a particular system. Some implementations may provide for an expert mode where a user may modify the results if the user knows the required programming techniques.

Other implementations are within the scope of the following claims.

What is claimed is:

1. A computer-implemented method for customizing a computer system, the method comprising:

providing an interface to customization project information for one or more computer systems;

enabling access to the customization project information for one or more computer systems using the interface;

enabling inspection of the customization project information for one or more computer systems using the interface;

enabling modification of the customization project information for one or more computer systems using the interface;

receiving an indication of one of multiple types of software modifications to be made to at least one of the one or more computer systems;

identifying, based on the indicated type of software modification, one of multiple user interfaces to be displayed to obtain information to be used to customize the at least one of the one or more computer systems;

displaying the identified user interface to obtain information to be used to customize the at least one of the one or more computer systems;

receiving, through the displayed user interface, user-input customization information to be used to customize the at least one of the one or more computer systems, with each computer system being associated with one or more programming models;

accessing, from computer-accessible medium, customization process information for the indicated type of software modification, the customization process information being associated with one or more programming templates, with each programming template being associated with a programming model;

accessing, from computer-accessible medium, one of the one or more programming templates associated with a programming model that is associated with the at least one of the one or more computer systems; and generating one or more customization objects for the programming model associated with the accessed programming template using the accessed customization process information and the accessed programming template.

2. The method of claim 1 wherein:
receiving customization information comprises receiving information about an attribute to be added to the at least one of the one or more of the computer systems, and
generating one or more customization objects comprises generating a user interface associated with the attribute to be added and generating a data management system object associated with the attribute to be added.

3. The method of claim 1 wherein:
receiving customization information comprises receiving information about an object class to be added to the at least one of the one or more of the computer systems, and
generating one or more customization objects comprises generating an object class to be added and a user interface associated with the object class to be added.

4. The method of claim 1 wherein:
receiving customization information comprises receiving information about a table to be added to the at least one of the one or more of the computer systems, and
generating one or more customization objects comprises generating a database table to be added and generating a user interface associated with the database table to be added.

5. The method of claim 1 further comprising associating the generated customization objects with a particular extension for a particular computer system.

6. The method of claim 1 wherein the modification of the customization project information for one or more computer systems comprises adding customization project information.

7. The method of claim 1 wherein the modification of the customization project information for one or more computer systems comprises deleting customization project information.

8. The method of claim 1 wherein the modification of the customization project information for one or more computer systems comprises updating customization project information.

9. The method of claim 1 wherein the customization project information comprises customization project information for customizing at least two computer systems.

10. A computer-readable medium having embodied thereon a computer program configured to customize a computer system, the computer program including code segments that, when executed, are configured to:
provide an interface to customization project information for one or more computer systems;
enable access to the customization project information for one or more computer systems using the interface;
enable inspection of the customization project information for one or more computer systems using the interface;
enable modification of the customization project information for one or more computer systems using the interface;
receive an indication of one of multiple types of software modifications to be made to at least one of the one or more computer systems;
identify, based on the indicated type of software modification, one of multiple user interfaces to be displayed to obtain information to be used to customize the at least one of one or more computer systems;
display the identified user interface to obtain information to be used to customize the at least one of the one or more computer systems;
receive, through the displayed user interface, user-input customization information to be used to customize the at least one of the one or more computer systems, with each computer system being associated with one or more programming models;
access, from computer-readable medium, customization process information for the indicated type of software modification, the customization process information being associated with one or more programming templates, with each programming template being associated with a programming model;
access, from computer-readable medium, one of the one or more programming templates associated with a programming model that is associated with the at least one of the one more computer systems; and
generate one or more customization objects for the programming model associated with the accessed programming template using the accessed customization process information and the accessed programming template.

11. The medium of claim 10 wherein:
the code segment configured to receive customization information comprises a code segment configured to receive information about an attribute to be added to one or more of the computer systems, and
the code segment configured to generate one or more customization objects comprises a code segment configured to generate a user interface associated with the attribute to be added and to generate a data management system object associated with the attribute to be added.

12. The medium of claim 10 wherein:
the code segment configured to receive customization information comprises a code segment configured to receive information about an object class to be added to one or more of the computer systems, and
the code segment configured to generate one or more customization objects comprises a code segment configured to generate an object class to be added and a user interface associated with the object class to be added.

13. The medium of claim 10 wherein:
the code segment configured to receive customization information comprises a code segment configured to receive information about a table to be added to one or more of the computer systems, and
the code segment configured to generate one or more customization objects comprises a code segment configured to generate a database table to be added and to generate a user interface associated with the database table to be added.

14. The medium of claim 10 further comprising a code segment configured to associate the generated customization objects with a particular extension for a particular computer system.

15. The medium of claim 10 wherein the modification of the customization project information for one or more computer systems comprises adding customization project information.

16. The medium of claim 10 wherein the modification of the customization project information for one or more computer systems comprises deleting customization project information.

17. The medium of claim 10 wherein the modification of the customization project information for one or more computer systems comprises updating customization project information.

18. The medium of claim 10 wherein the customization project information comprises customization project information for customizing at least two computer systems.

19. A system for customizing a computer system, the system comprising a processor connected to a storage device and one or more input/output devices, wherein the processor is configured to:
provide an interface to customization project information for one or more computer systems;
enable access to the customization project information for one or more computer systems using the interface;
enable inspection of the customization project information for one or more computer systems using the interface;
enable modification of the customization project information for one or more computer systems using the interface;
receive an indication of one of multiple types of software modifications to be made to the at least one of the one or more computer systems;
identify, based on the indicated type of software modification, one of multiple user interfaces to be displayed to obtain information to be used to customize the at least one of the one or more computer systems;
display the identified user interface to obtain information to be used to customize the at least one of to one or more computer systems;
receive, through the displayed user interface, user-input customization information to be used to customize the at least one of the one or more computer systems, with each computer system being associated with one or more programming models;
access, from computer-readable medium, customization process information for the indicated type of software modification, the customization processing information being associated with one or more programming templates, with each programming template being associated with a programming model;
access, from computer-readable medium, one of the one or more programming templates associated with a programming model that is associated with the at least one of one of the one or more computer systems; and
generate one or more customization objects for the programming model associated with the accessed programming template using the accessed customization process information and the accessed programming template.

20. The system of claim 19 wherein.
receiving customization information comprises receiving information about an attribute to be added to one or more of the computer systems, and
generating one or more customization objects comprises generating a user interface associated with the attribute to be added and generating a data management system object associated with the attribute to be added.

21. The system of claim 19 wherein:
receiving customization information comprises receiving information about an object class to be added to one or more of the computer systems, and
generating one or more customization objects comprises generating an object class to be added and a user interface associated with the object class to be added.

22. The system of claim 19 wherein:
receiving customization information comprises receiving information about a table to be added to one or more of the computer systems, and
generating one or more customization objects comprises generating a database table to be added and generating a user interface associated with the database table to be added.

23. The system of claim 19 wherein the processor is further configured to associate the generated customization objects with a particular extension for a particular computer system.

24. The system of claim 19 wherein the modification of the customization project information for one or more computer systems comprises adding customization project information.

25. The system of claim 19 wherein the modification of the customization project information for one or more computer systems comprises deleting customization project information.

26. The system of claim 19 wherein the modification of the customization project information for one or more computer systems comprises updating customization project information.

27. The system of claim 19 wherein the customization project information comprises customization project information for customizing at least two computer systems.

* * * * *